June 24, 1952 A. L. JUDSON 2,601,529
STOKER CONTROL SYSTEM
Filed Feb. 11, 1949 7 Sheets-Sheet 1

INVENTOR
ALBERT L. JUDSON

BY
ATTORNEY

June 24, 1952  A. L. JUDSON  2,601,529
STOKER CONTROL SYSTEM
Filed Feb. 11, 1949  7 Sheets-Sheet 4

INVENTOR
ALBERT L. JUDSON
BY
ATTORNEY

June 24, 1952 A. L. JUDSON 2,601,529
STOKER CONTROL SYSTEM
Filed Feb. 11, 1949 7 Sheets-Sheet 5

INVENTOR
ALBERT L. JUDSON

ATTORNEY

June 24, 1952         A. L. JUDSON         2,601,529
STOKER CONTROL SYSTEM
Filed Feb. 11, 1949                                   7 Sheets-Sheet 6

INVENTOR
ALBERT L. JUDSON

ATTORNEY

June 24, 1952

A. L. JUDSON 2,601,529

STOKER CONTROL SYSTEM

Filed Feb. 11, 1949

INVENTOR
ALBERT L. JUDSON

BY *[signature]*

ATTORNEY

Patented June 24, 1952

2,601,529

UNITED STATES PATENT OFFICE 2,601,529

STOKER CONTROL SYSTEM

Albert L. Judson, Portland, Oreg., assignor to Iron Fireman Manufacturing Company, Portland, Oreg.

Application February 11, 1949, Serial No. 75,874

6 Claims. (Cl. 236—9)

This invention relates generally to control systems for automatic coal stokers. More particularly this invention relates to the more effective types of stoker control systems in which a combustion gas temperature responsive instrument not only influences the re-fueling operation cycle of the system but which also provides an outfire shut down means which becomes effective if any operation of the stoker extends beyond a pre-determined time without attaining a pre-determined value of combustion gas temperature.

In the previous art a system of this general type would include a stoker relay and re-fueling timer in one instrument and a combustion gas temperature responsive means in another instrument separately mounted and electrically connected with the first instrument.

In the present system both these functions are combined into one stack mounted instrument whereby great simplification of circuits and mechanism are made possible and great economies in both controller construction and installation may be had.

It is, therefore, an object of this invention to provide a simplified stoker control system which yet accomplishes all of the desired functions found to be desirable in such a system.

It is a second object to provide a system using a simplified master controller combining the functions of the stoker relay, re-fueling timer, and stack switch.

A third object is to provide a system in which the stack switch functional parts are in such proximity to the relay and timer parts that the stack switch may be mechanically effective to modify the operations of the relay and timer.

A fourth object is to provide such a system both economical to build and to install.

How these and other objects are attained will be made clear by the following explanation and by reference to the attached drawings, in which:

Fig. 2 represents the system in normal operating condition with the stoker idle.

Fig. 3 represents the system in normal operating condition with the stoker operating during a re-fueling interval.

Fig. 4 represents the system abnormally out of operating condition after the outfire switch has opened due to lack of temperature rise within the outfire time during a re-fueling period.

Referring now to the drawing, there is shown a controller case 30 having a removable front cover 31 and a removable rear cover 32. Sheet metal terminal barrier 33 is spot welded to conduit terminal bracket 34 held to case 30 by screws 35. Thermostat wire entrance orifice 36 in bracket 34 has its perimeter smoothly rounded to prevent fraying of the thermostat wires.

Insulation sheet 37 is clamped to base 30 by hollow-backed, molded, insulating terminal block 38 having its upper narrow base flange 39 slipped under clips 40 pressed forwardly out of base 30 and by screw 41 inserted through a hole in block 38 and threaded into base 30. Recessed as shown into the front of block 36 are thermostat terminals T1 and T2, line terminal 101, motor terminal 103, and ground terminal 102. Partially surrounded by raised barrier 42 on block 38 is alarm terminal 104.

Timing motor TM is secured to the rear of base 30 by screws 43. Transformer TR is secured to the rear of base 30 by screw 44. Wire 45 connects one side of coil 51 of timing motor TM and one high voltage side of coil 61 of transformer TR to ground terminal 102. Wire 46 connects the other lead of coil 51 and the other high voltage transformer lead to conducting bar 47 which in turn connects with terminal 104 and carries stationary contact 48 of solenoid switch SS and stationary contact 49 of outfire switch OS.

Solenoid switch frame 50 is secured to the front of base 30 and carries solenoid coil 71 and pivotally carries solenoid armature 52 on ears 53 and 54. Tension spring 55 hooked at one end over ear 56 of solenoid frame 50 and hooked at its other end over tongue 57 pressed forwardly from armature 52 biases armature 52 away from coil 71, and through insulating pin 58 journalled in block 38 holds solenoid switch SS in open position when coil 71 is not energized. Spring blade 59 secured to terminal 103 and carrying movable contact 60 of switch SS biases switch SS to closed position.

Wires 62 and 63 from solenoid coil 71 connect respectively to thermostat terminal T1 and one side of the low voltage coil of transformer TR. The other side of the low voltage coil of transformer TR is connected by wire 64 to thermostat terminal T2.

Referring now to the combustion gas temperature responsive mechanism of the controller, heat responsive stainless steel tube 65 is welded to supporting flange 66 which in turn is secured to die casting 67 by screws 68 inserted through holes in flange 66 and threaded into holes 69 in casting 67. Casting 67 is secured to case 30 by screws 70. Porcelain tube 72 which has a very low temperature coefficient of expansion is piloted at one end on the reduced diameter end of plug 73 welded into tube 65 and abuts plug 73. Plug 74 abuts tube 72 at its other end and has reduced end portion 75 piloted in tube 72 and reduced end portion 76 protruding through a clearance hole in pipe cap 77 threaded onto tube 65 thus confining spring 78 and causing plug 74 to be moved toward or away from case 30 in accordance to a decrease or increase in the length of tube 65 due to the change in its temperature caused by the change in temperature of the combustion gases to which it may be exposed.

Figure 6:
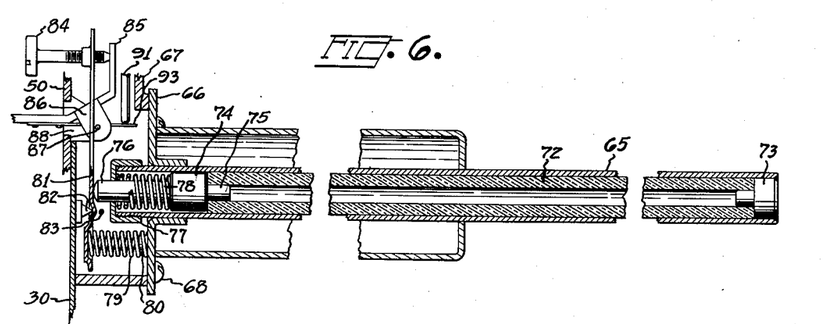
Fig. 6 is a section through the temperature responsive mechanism of the controller. The section line is shown by the line 6—6 of Fig. 5.

Spring 79 piloted on one end on boss 80 raised on the front surface of flange 66 has its other end confined by a depression in lever 81 fulcrumed on knife edge 82 secured to the rear of case 30. As shown in Fig. 6, spring 79 acting on one side of knife edge 82 causes lever 81 at all times to be pressed firmly against plug end 76 so that lever 81 at all times follows the movement of plug end 76 with respect to case 30. Cage wire 83 is merely an assembly aid and prevents lever 81 from leaving its location with respect to knife edge 82 when flange 66 with plug end 76 and spring 79 are removed. Dial headed screw 84 is threaded through lever 81 as shown. Latch lever 85 through ears 86 formed thereon and hinge pin 87 is pivotally carried on ears 88 formed on solenoid frame 50 secured to case 30. Screw 84 causes lever 85 to move about pin 87 with a motion equivalent to the motion of lever 81 about knife edge 82.

Latch 89 formed on lever 85 is positioned to engage armature 52 at a temperature of heat responsive tube 65 adjusted by dial screw 84. Thus when solenoid coil 71 is energized and armature 52 is attracted toward coil 71 and switch SS is allowed to close, then, if tube 65 is at or below the temperature determined by screw 84, lever 85 will drop and latch 89 will prevent the opening of switch SS by armature 52 until the temperature of tube 65 has increased to the value preset by screw 84. Upwardly biased by spring 90, reset pin 91 guided in a clearance hole in casting 67, and protruding to the outside of case 30 through slot 92 formed therein, can be manually depressed to co-operate with spring blade 93 secured to lever 85 to raise latch 89 out of its interference position with armature 52.

Pin 94 hinges rack arm 95 to bracket 109 secured to case 30 by screws 96. Index arrow 97 on bracket 109 co-operates with dial markings on screw 84 to indicate the temperature adjustment position of latch 89 with respect to armature 52.

Screw 113 adjustably threaded into rack arm 95 co-operates with latch lever 85 to hold rack 95 out of engagement with gear 111 whenever latch lever 85 is tipped up far enough for latch 89 to allow armature 52 to retract. Thus rack arm 95 can only engage gear 111 when coil 71 is energized and element 65 is below a predetermined temperature.

Roller 98 pivoted in spring clip 99 secured to armature 52 by screw 110 is positioned to contact the underside of arm 95 when latch 89 releases armature 52. As armature 52 pivots on ears 53 and 54 of frame 50 roller 98 tends to swing in an arc about ears 53 and 54 taking its lowest position when coil 71 is energized and attracts armature 52 and its highest position when armature 52 is retracted by spring 55 after being released by coil 71 and latch 89. The effect of this upward motion of roller 98 is to give a quick upward shove to arm 95 and assure its complete freedom from gear 111. This action of roller 98 makes unnecessary a close calibration of screw 113.

Pinion 114 fixed to the output shaft of timing motor TM meshes with and drives gear 115 fixed to cam shaft 116 journalled as shown in case 30 and gear frame 117 secured to case 30 by screw 118.

Figure 21:
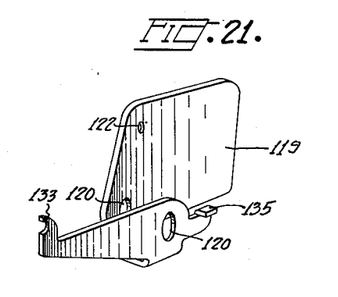
Fig. 21 is a perspective detail of the walking lever of the outfire timing switch mechanism.
Figure 22:
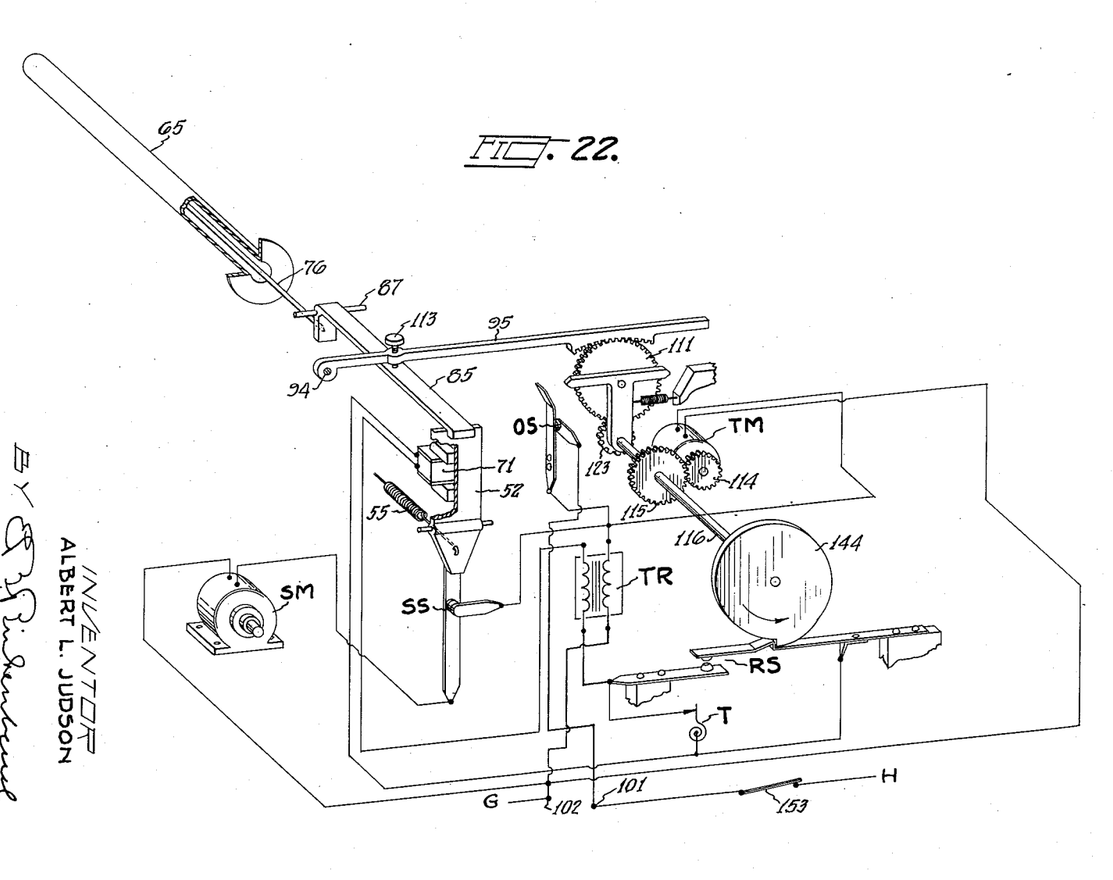
Fig. 22 is a schematic drawing showing the construction and mode of operation of the described form of this invention.

Walking lever 119 formed as shown in Fig. 21 has bearing holes 120 journalled on shaft 116. Pivot pin 121 staked in hole 122 of lever 119 rotatably carries walking gear 111 always meshed with and driven by pinion 123 concentric with and fixed to shaft 116. Tension spring 124 hooked at one end to the extension of pin 121 and at the other to frame 117 biases walking lever 119 in a clockwise direction viewed from the front of the controller.

Cam arm 125 is rotatably mounted on shaft 116. Aligned with arm 125 is latch plate 126 carried by frame 117. Pivot hook 127 of plate 126 engages the upper end of a slot formed in frame 117 and guide ear 128 freely rests in the bottom of the slot. Lobe 129 of arm 125 is normally positioned between lobe 130 and latch 131 of plate 126. Eye 132 is pressed laterally from arm 125 into alignment with hook 133 of lever 119. Spring 134 connects eye 132 with hook 133.

Figure 7:
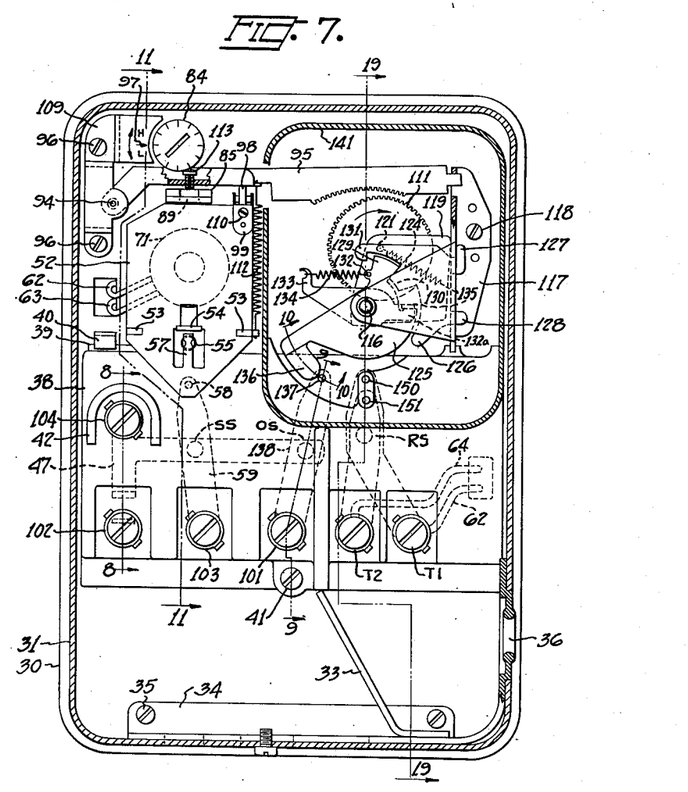
Fig. 7 is a front elevation of the mechanism of the controller.
Figure 8:
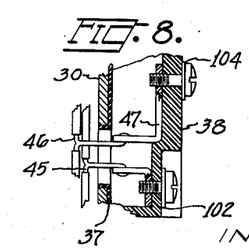
Fig. 8 is a section along the line 8—8 of Fig. 7.
Figure 9:
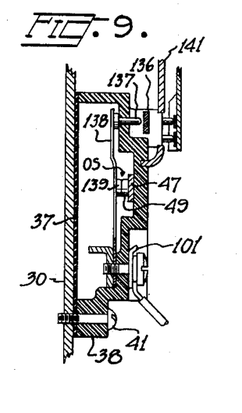
Fig. 9 is a section along the line 9—9 of Fig. 7.
Figure 10:
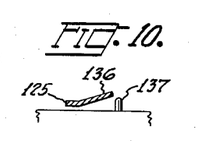
Fig. 10 is a section along the line 10—10 of Fig. 7.
Figure 11:
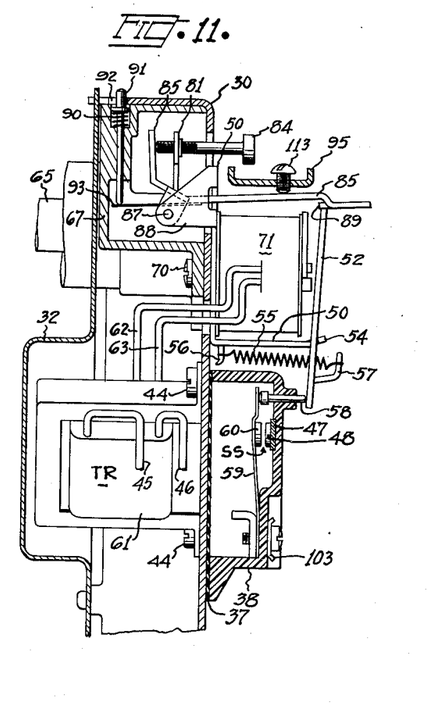
Fig. 11 is a section along the line 11—11 of Fig. 7.
Figure 12:
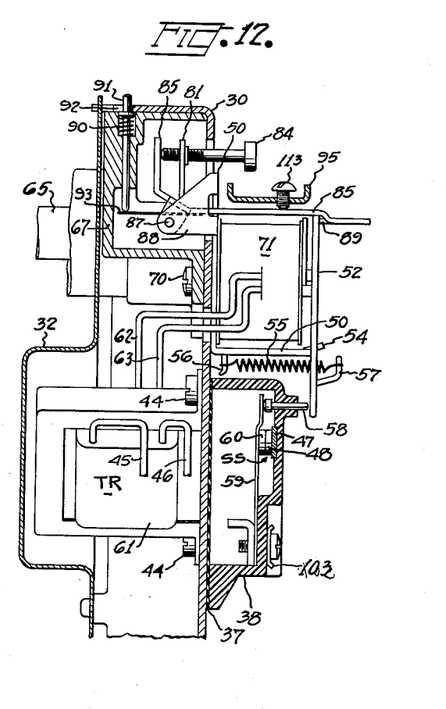
Fig. 12 is the same as Figure 11 but with solenoid switch closed and armature latched.
Figure 13:
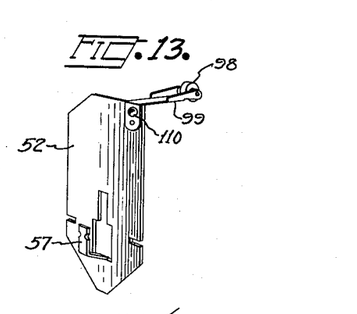
Fig. 13 is a perspective detail of the solenoid armature or solenoid switch pin actuator.

It is seen that when rack 95 is disengaged from gear 111, spring 124 urges lever 119 in a clockwise direction until it is stopped by striking frame 117. In this clockwise motion, the under side of foot 135 of lever 119 engages radial edge 132-A of arm 125 and carries arm 125 clockwise until lever 119, arm 125, and latch plate 126 are in the idle position shown in Fig. 7. Gear 111 is continuously driven clockwise by timing motor TM.

Figure 16:
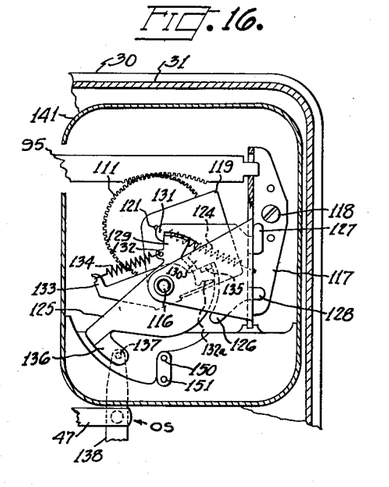
Figure 17:
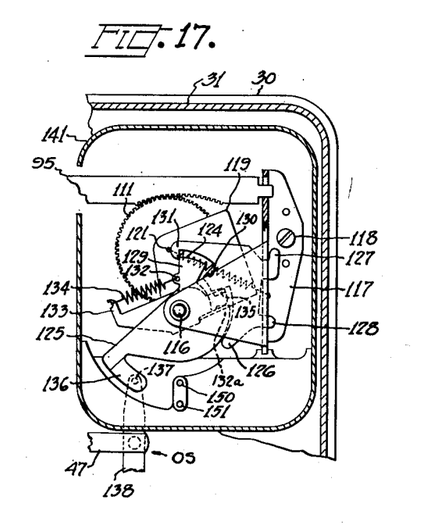
Figure 18:
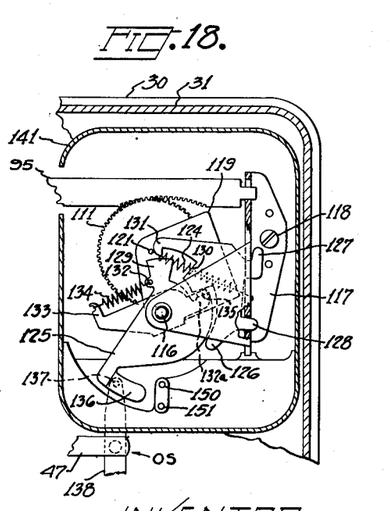
Figure 19:
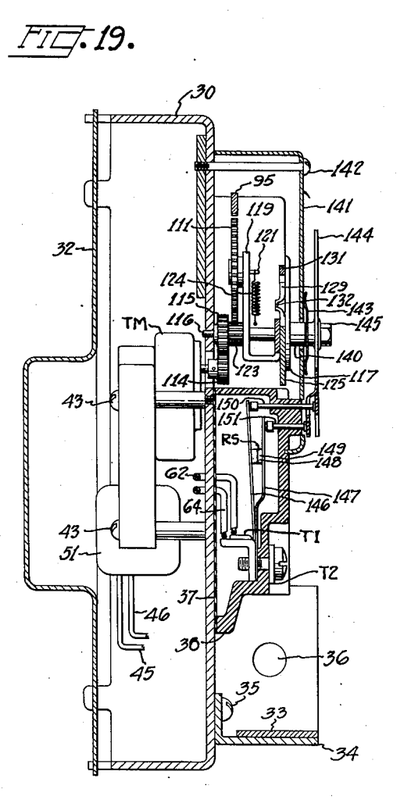
Fig. 19 is a section along the line 19—19 of Fig. 7 with the refuel switch open, the refuel switch cam being in the position shown in Fig. 14.
Figure 20:
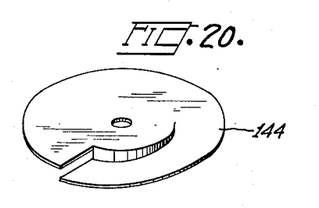
Fig. 20 is a perspective detail of the refuel switch cam.

When the rack 95 drops and engages gear 111, an outfire switch timing period is started which may be halted at any time by the disengagement of rack 95 with gear 111 or if the rack and gear are not disengaged will be carried through to completion as shown in successive position of the elements in Figs. 7, 15, 16, 17 and 18. Starting with the idle position shown in Fig. 7, in Fig. 15 gear 111 has advanced along rack 95 taking lever 119 with it in a counterclockwise direction. Through spring 134 lever 119 has moved arm 125 until lobe 129 has come into contact with latch 131 of plate 126. In Fig. 16, it is seen that the further motion of lever 119 merely extends spring 134 until as seen in Fig. 17, foot 135 of lever 119 contacts the underside of lobe 130 of latch plate 126. With a further advance of gear 111 as shown in Fig. 18, foot 135 of lever 119 pushes on lobe 130 of plate 126 until latch 131 disengages lobe 129 of cam arm 125 and spring 134 suddenly advances arm 125 until stopped by eye 132 of arm 125 striking lever 119.

Cam arm 125 is bent forwardly at its hooked end to form rearwardly sloping cam 136, the outer end of which as shown in Figs. 9, 7, 15, 16 and 17 is normally positioned over insulating pin 137 slidably positioned in a hole formed in terminal block 38 and resting against outfire switch blade 138 fixed at one end to terminal 101 and carrying outfire switch contact 139. As sloping cam 136 advances from the position shown in Fig. 17 to the position shown in Fig. 18, cam 136 depresses pin 137 which causes blade 138 to flex and separate outfire switch contacts 49 and 139, thus de-energizing the equipment and ending the outfire timing period.

Forwardly of frame 117, spacer 140 is slipped over shaft 116 and gear cover 141 is put in place and held by screws 142. Spring disk 143 is then slipped over shaft 116, followed by cam disk 144 and both are held in place by nut 145 threaded onto the end of shaft 116. Cam disk 144 is thus frictionally adjustable in angular position on shaft 116, but will normally be continuously rotating with shaft 116 in a counterclockwise direction.

Figure 14:
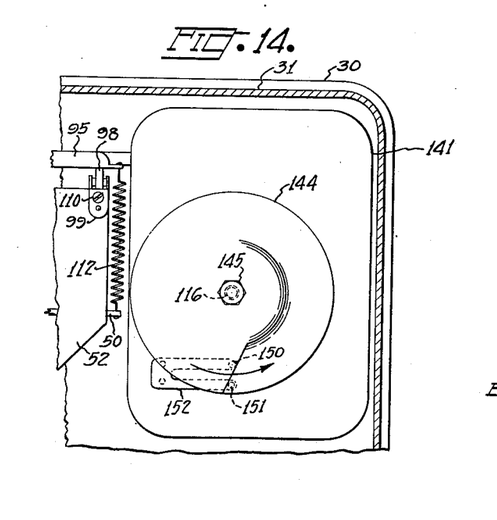
Fig. 14 is a fragmental front elevation of the controller showing the timing mechanism cover and the refuel cam in place over the mechanism shown in the upper right hand corner of Fig. 7.
Figure 15:
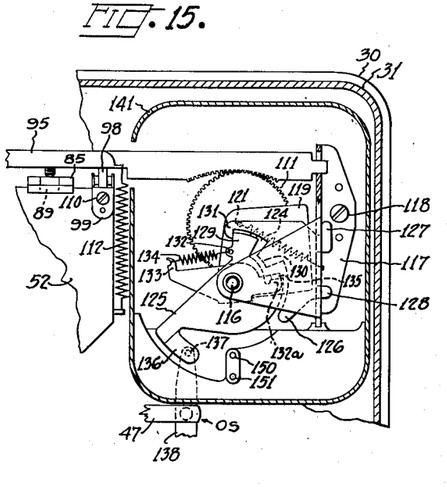
Figs. 15 to 18 show the mechanism shown in the upper right hand corner of Fig. 7 in progressive steps of operation.

Re-fueling switch RS comprises two spring blades 146 and 147, one end of each being secured respectively to thermostat terminals T1 and T2, and carrying respectively switch contacts 148 and 149. The free end of each blade is inherently biased toward and bears against insulating pins 150 and 151 respectively. Pins 150 and 151 are slidably carried in vertically spaced holes formed in terminal block 38 and have their opposite ends each pressing one of the legs of horizontally U-shaped flat spring member 152 against the rearward side of the spiral cam faced periphery of disk 144. Member 152 is riveted to cover 141 as shown in Fig. 14.

Disk 144 is slit radially for the width of the cam face and as installed the trailing end of the cam is depressed rearwardly. In operation contacts 148 and 149 are normally separated because of the pressure of the cam face on blades 146 and 147 exerted through pins 150 and 151. However, the respective lengths of the legs of member 152 are such that as the trailing end of the cam face of disk 144 comes to the position of pins 150 and 151 the leg of member 152 which bears on pin 150 will drop off the trailing end of the cam before the leg which bears on pin 151 and during the short space of time between the dropping off of the respective legs contacts 148 and 149 of re-fueling switch RS will be closed.

Figure 1:
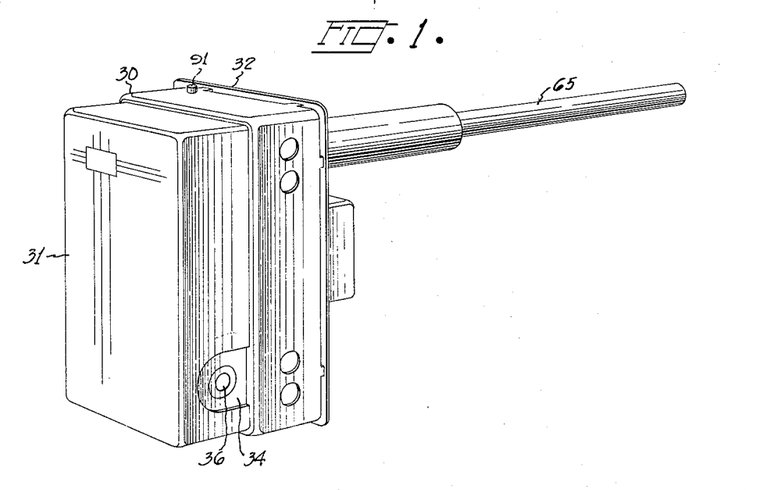
Fig. 1 is a general view in perspective of the complete control.
Figure 2:
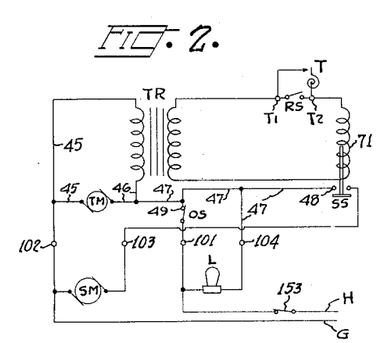
Figs. 2, 3 and 4 are schematic wiring diagrams of the electric control system including the control of this invention together with the stoker motor, the pilot thermostat, the limit control, and the outfire alarm lamp.
Figure 3:
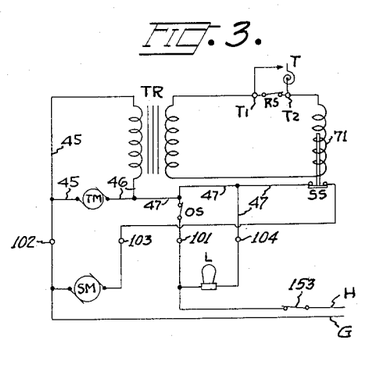
Figure 4:
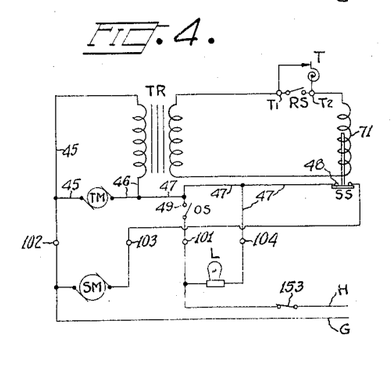
Figure 5:
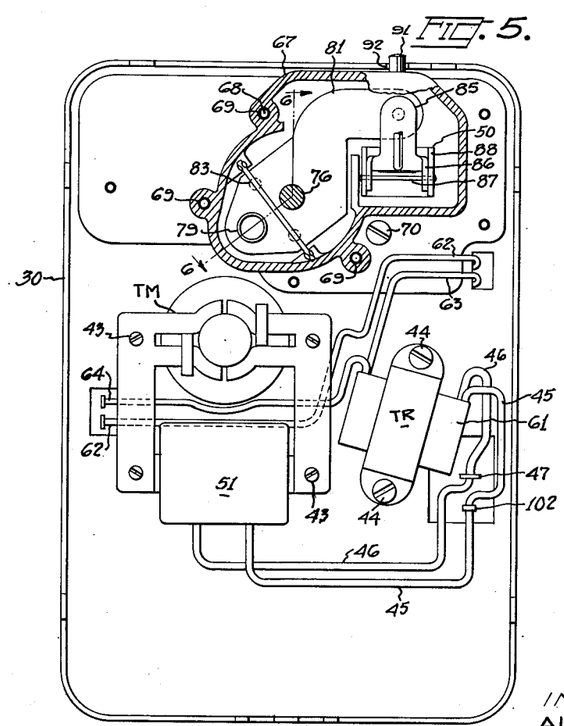
Fig. 5 is a rear elevation of the controller with the rear cover and the temperature responsive stem removed.

To explain the operation of the stoker system using this controller reference is made to Figs. 2, 3 and 4 showing simplified schematic electrical diagrams of the system. In these diagrams an electric supply line is shown with the grounded wire G connected to terminal 102 of the controller and the higher potential wire H connected to terminal 101 of the controller. Limit control 153 is shown in series with wire H. The stoker motor is connected between terminal 102 and 103. The thermostat is connected across terminals T1 and T2, and an outfire indicating lamp L or equivalent device is connected across terminals 101 and 104, it being understood that this device is of relatively high impedance with respect to the windings of the stoker motor SM.

It is seen that the system is energized through line H, limit control 153, terminal 101, and outfire switch OS from which point parallel circuits are completed to terminal 102 or line G in one case through the timing motor TM, in another case through the primary coil of transformer TR and in the third case through solenoid switch contacts SS (when closed) and stoker motor SM.

The low voltage circuit includes the secondary winding of transformer TR, operating coil 71 of solenoid switch SS and, in parallel, the thermostat T and the re-fueling switch RS.

As shown in Fig. 2, the limit and outfire switches are closed, the thermostat, re-fueling switch, and consequently the solenoid switch are open and the timing motor and transformer are energized. Since switch SS is open the stoker motor is not operating. Fig. 2 thus illustrates a normal condition of the system when there is no call for heat but in which the controller is timing a fixed interval (one revolution of disk 144) to the next initiation of a re-fueling period.

Fig. 3 illustrates the condition of the system during a fixed part of a re-fueling period or for the time that the re-fueling switch is closed. It is seen that coil 71 will be energized and therefore switch SS will be closed and the stoker motor SM will be operating. But here a particular feature of this controller not illustrated in the electrical diagrams comes into action. From the previous description of the mechanism of the controller it is remembered that whenever coil 71 is energized and switch SS is closed, latch 89 can drop to latch armature 52 and consequently switch SS in closed position unless combustion gas temperature responsive element 65 is above the predetermined temperature for which screw 84 has been adjusted. If element 65 is above the selected temperature, lever 85 will not drop for latch 89 to engage armature 52 and after the short time (usually not over 30 seconds) required for disk 144 to advance enough to drop pin 151 switch RS will open and the re-fuel period will be over. However, if element 65 is below the selected temperature, lever 85 will be free to drop thus latching armature 52 and holding switch SS in closed position. Also when armature 52 is attracted to coil 71 and lever 85 drops, rack 95 will drop also and engage gear 111 and thus initiate an outfire timing period. The re-fueling will thus be extended beyond the period when the re-fueling switch is closed and will continue until the temperature of element 65 rises sufficiently to raise lever 85 and release armature 52 from latch 89. If this re-fueling period is extended without the temperature of element 65 rising the predetermined amount and continues for the outfire timing period (about 45 minutes) for which the controller is constructed the outfire switch OS will be opened as previously explained and the entire system will be shut down.

Similarly to the cycle of operation just explained if the thermostat calls for heat by closing its contacts, switch SS will close to start the stoker motor, and if element 65 is below the pre-determined temperature switch SS will be latched in and an outfire timing period started. Here also if the temperature of element 65 does not rise to the pre-determined temperature within the timed outfire period the system will be shut down by the opening of the outfire switch.

Fig. 4 indicates the electrical condition of the system after an operation had been initiated by the re-fueling switch but in which the combustion gas temperature did not rise sufficiently in the outfire time and the system has gone to outfire. The re-fuel switch has opened (after only about 30 seconds of operation) but switch SS remains latched closed and after the outfire period has run out outfire switch OS has opened. High impedance signal device L now completes a circuit from wire H to terminal 194, through bar 47, switch SS and the stoker motor to wire G. The small current passed by the signal device will not operate the stoker motor.

With attention thus called to the outfire condition of the system the difficulty can be overcome and then by manually depressing reset pin 91 extending through the top of case 30 the controller is reset to normal operating condition.

Having thus completely described the mechanism and operation of the control system of this invention and the primary controller which makes the system possible.

I claim:

1. An electric system for the control of an electrically operated stoker, comprising a source of electric power, an electric motor for driving said stoker, a first switching means operable to connect said motor to said power source, electrical operating means for said first switching means, a condition responsive second switching means operable to connect said operating means to said power source and to disconnect said operating means from said power source, a condition responsive lever means operable to latch said first switching means closed after said first switching means has been closed by said electrical operating means, a third switching means operable to disconnect said motor from said source of power, an aperiodic timing means operable to open said third switching means after having timed a definite time, means responsive jointly to said electrical operating means and said lever means operable to start said aperiodic means and to reset said aperiodic means in less than said definite time.

2. A controller for an electrically operated stoker, comprising a first line terminal, a second line terminal, said first and second line terminals being connected to an electric power source, a motor terminal, a stoker operating motor connected to said motor terminal and one of said line terminals, an alarm terminal, an alarm means connected to said alarm terminal and the other of said line terminals, a first thermostat terminal, a second thermostat terminal, a thermostat connected to said thermostat terminals, a timing motor having an operating coil, a magnetic relay having an operating coil, an armature, and a switch operated by said armature, a transformer having a primary winding and a secondary winding, an outfire switch, operating means for said outfire switch, a refueling switch, a condition responsive means, means connecting said first line terminal with one side of said outfire switch, means connecting the other side of said outfire switch with said alarm terminal, one side of said relay switch, one side of said primary coil of said transformer, and one side of said timing motor coil, means connecting said second line terminal with the other side of said primary coil of said transformer and the other side of said timing motor coil, means connecting said motor terminal with the other side of said relay switch, means connecting said first and second thermostat terminals in parallel with said refueling switch, and in series with said operating coil of said relay and said secondary coil of said transformer, means connecting said timing motor with said refueling switch, whereby said refueling switch will be periodically closed and opened when said timing motor coil is energized, means operable by said condition responsive means to couple said operating means with said timing motor when said relay operating coil is energized and to latch said armature in its coil-energized position, if said condition is below a pre-determined value, and thereafter to unlatch said armature and uncouple said operating means if said condition rises above said pre-determined value, said means operable by said condition responsive means including means to couple said outfire switch operating means with said timing motor when said armature is in its coil-energized position and said condition is below said pre-determined value, whereby said outfire switch will be opened in a pre-set time if said condition does not rise to said pre-determined value and whereby if said condition rises to said predetermined value within said pre-set time said outfire switch operating means will be uncoupled from said timing motor and returned to its starting position.

3. A system for the control of an electric motor drive for a stoker, said system comprising a source of electric power, means for connecting said motor to said source of power, an operating means for said connecting means, means for periodically energizing said operating means for short intervals of time, and a condition responsive latch lever adapted to maintain said connecting means in its connected position to extend any of said intervals until said condition has attained a pre-set value.

4. In a system for the control of an electric motor drive for a stoker, said system comprising means for energizing said motor periodically for short intervals of time and means for extending each of said intervals until a pre-set combustion temperature is reached, the improvement which comprises a switch means operable to cause said motor to be energized, a condition responsive lever means adapted to latch said switch means in its motor energized position while said condition is below a pre-set value and adapted to release said switch means to its motor de-energized position when said pre-set value of said condition is reached.

5. In a system for the control of an electric motor drive for a stoker, said system comprising means for energizing said motor periodically for short intervals of time, means for extending each of said intervals until a pre-set combustion temperature is reached, and means for de-energizing said motor when any of said intervals reaches a pre-set length, the improvement which comprises a rockably pivoted toothed rack, a continuously running mating gear movable along said rack when engaged therewith, a condition responsive means adapted to effect the engagement and disengagement of said rack and said gear, and means actuted by said gear in its movement along said rack to deenergize said motor if said movement proceeds to a pre-set position of said gear.

6. In a system for the control of an electric motor drive for a stoker, said system comprising means for energizing said motor periodically for short intervals of time, means for extending each of said intervals until a pre-set combustion temperature is reached, means for deenergizing said motor when any of said intervals reaches a pre-set length, automatic means for resetting said interval extending means whenever said pre-set combustion temperature is reached and manual means for resetting said interval extending means when any of said intervals reach said pre-set length, the improvement which comprises a first switch means operable to energize said motor, means for operating said first switch means, a condition responsive means, a pivoted lever having a latch thereon, means adapting said condition responsive means to control said latch to engage said operating means when said operating means is in its motor energized position and said condition is below a pre-set value, a second switch means operable to de-energize said motor, a delay means for operating said second switch means, said delay means comprising a rockably pivoted tooth rack, a continuously running gear movable along said rack when engaged therewith, means adapting said rack to be controlled by said lever to engage said gear when said first switch operating means is engaged by said latch, and means actuated by said gear in its movement along said rack to operate said second switch means when said gear proceeds to a pre-set position.

ALBERT L. JUDSON.

REFERENCES CITED

The following references are of record in the file of this patent:

UNITED STATES PATENTS

| Number | Name | Date |
|---|---|---|
| Re. 19,164 | Teeple | May 15, 1934 |
| 2,057,308 | Persons | Oct. 13, 1936 |
| 2,185,752 | Raney | Jan. 2, 1940 |
| 2,333,432 | Lum | Nov. 2, 1943 |
| 2,364,663 | Sampsel | Dec. 12, 1944 |
| 2,474,595 | Richardson | June 28, 1949 |